May 1, 1956 P. CUQ 2,743,691
APPARATUS FOR FORMING ARTICLES FROM HOLLOW BLANKS
Filed June 14, 1950 9 Sheets-Sheet 1
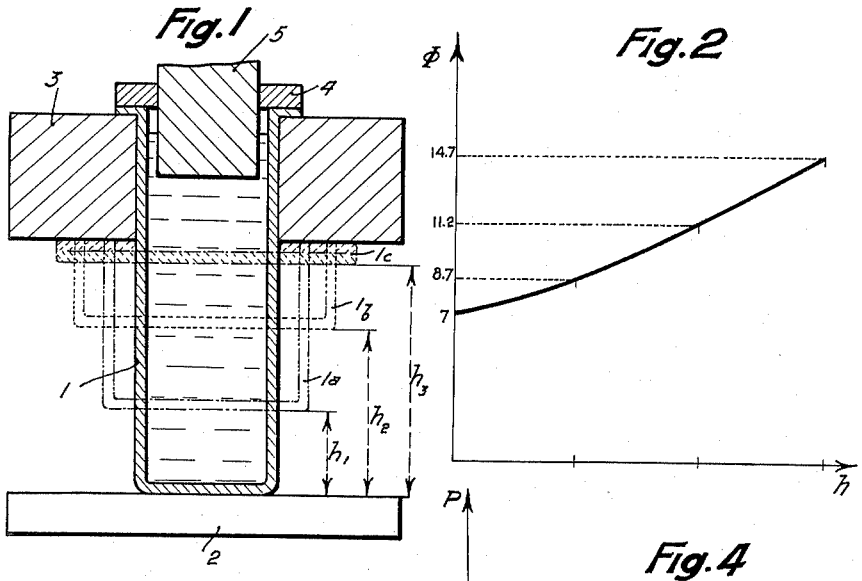
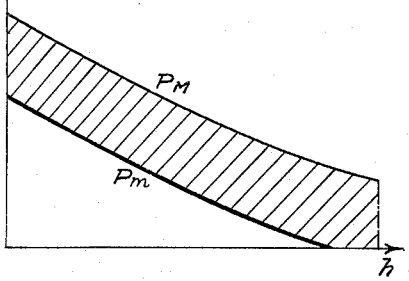
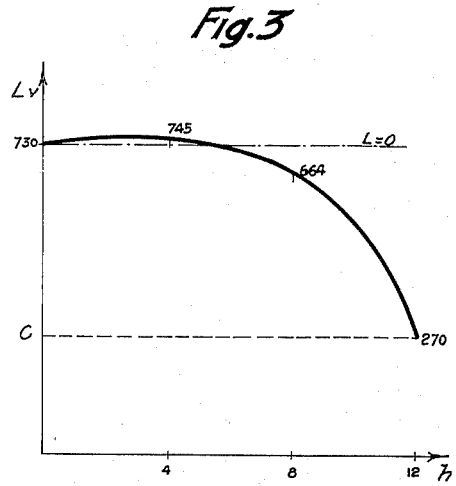
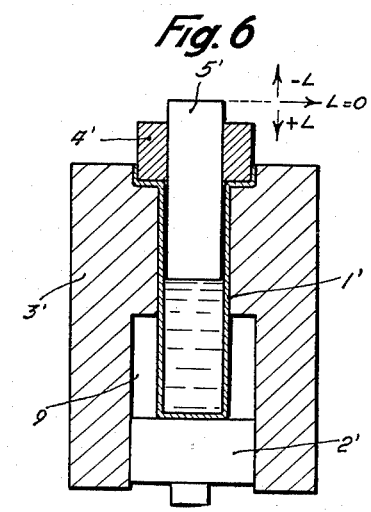
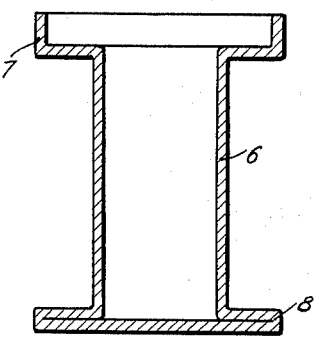
Inventor: Pierre Cuq,
By his attorneys,
Baldwin, Wight, + Prevost

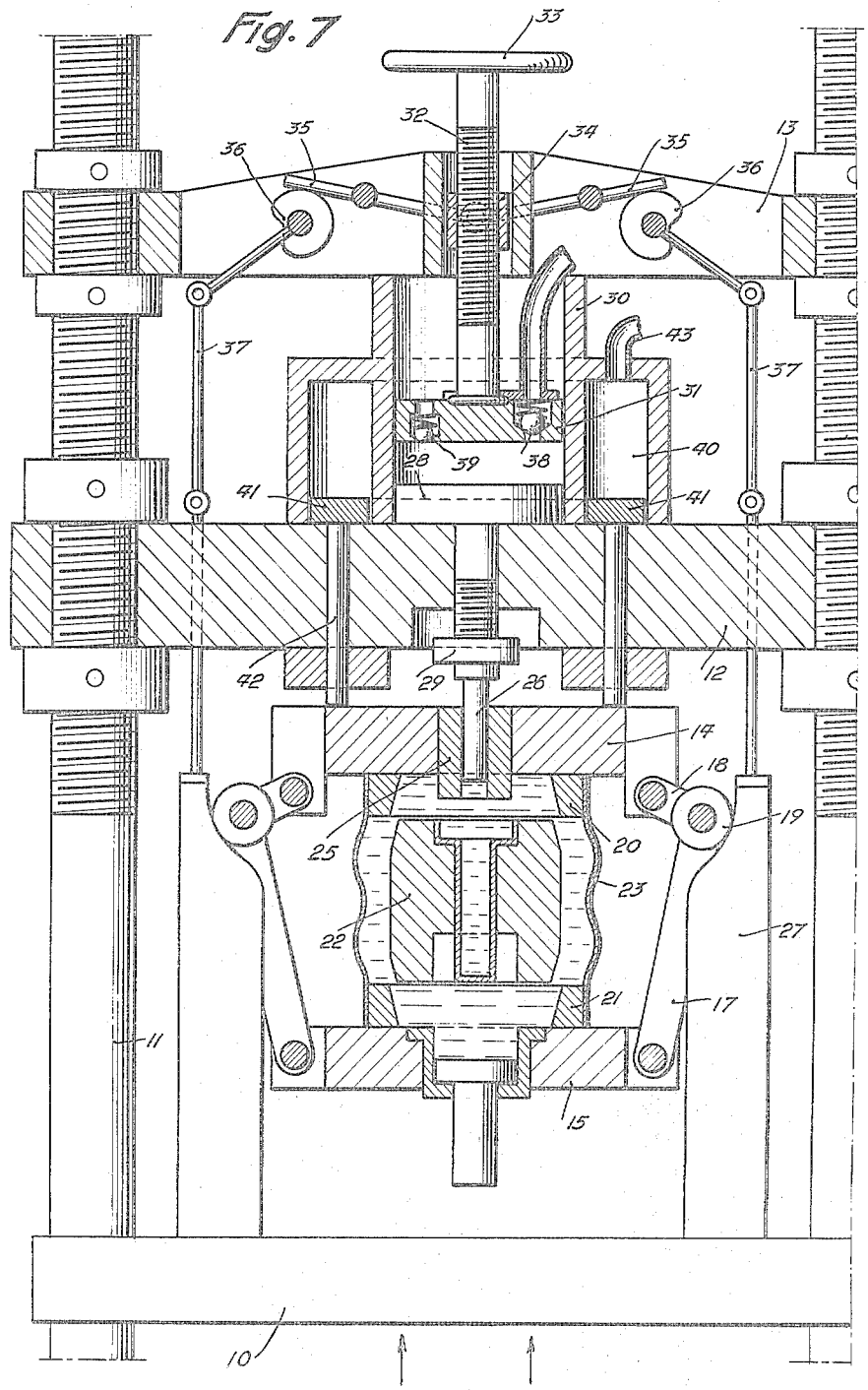

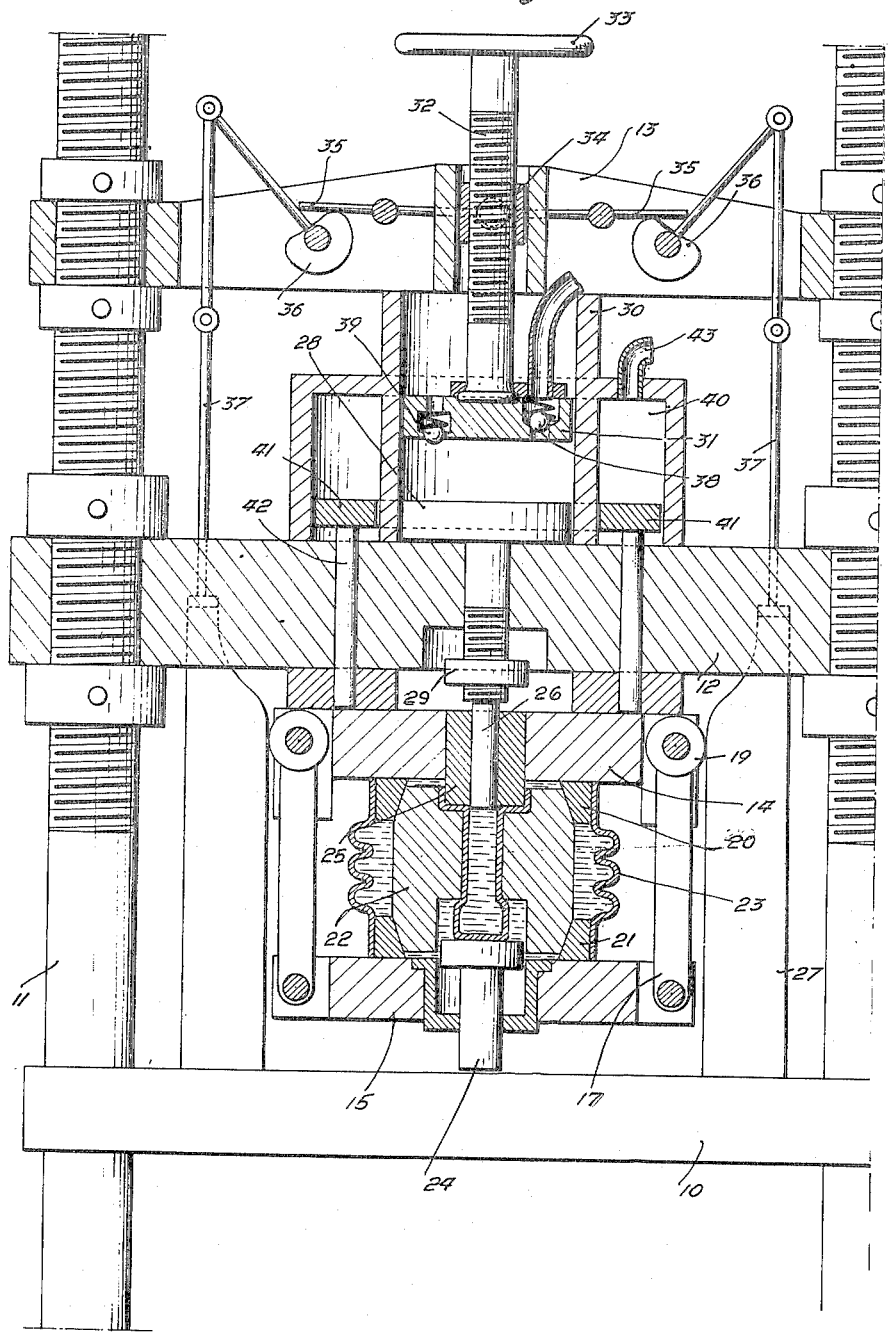

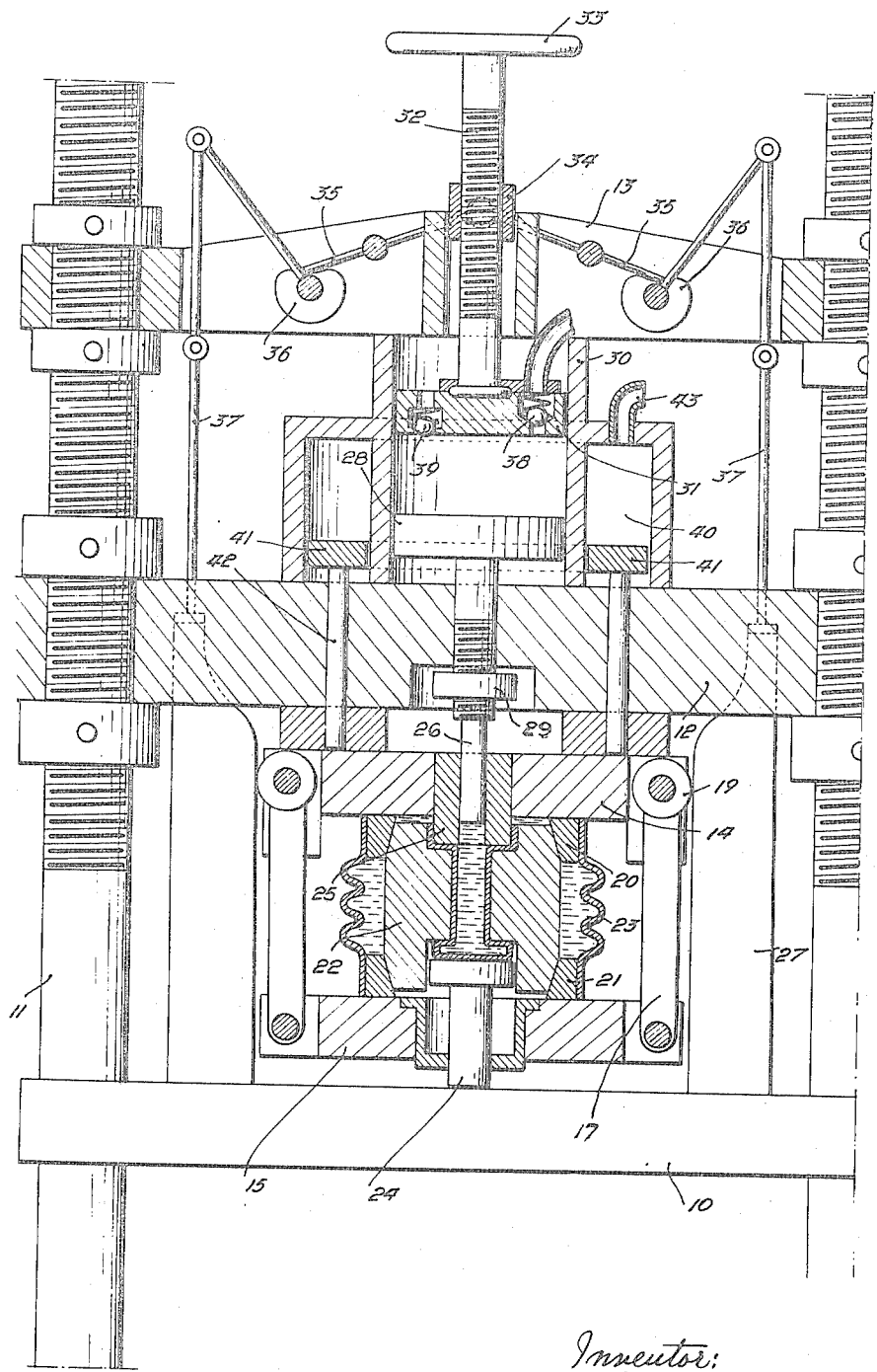

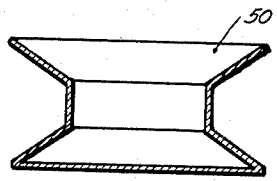
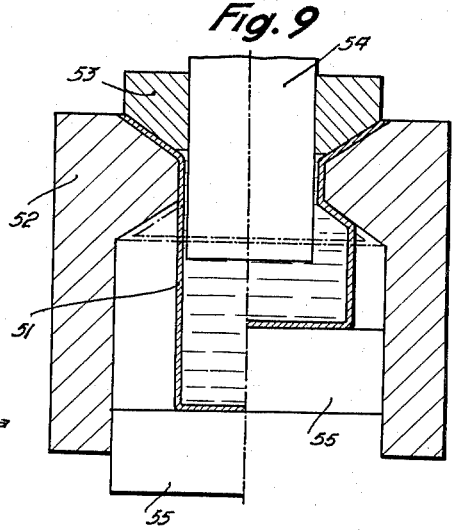
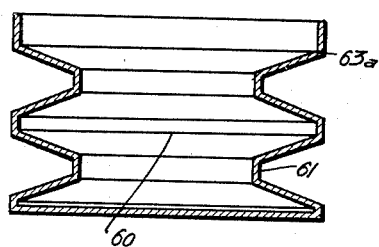
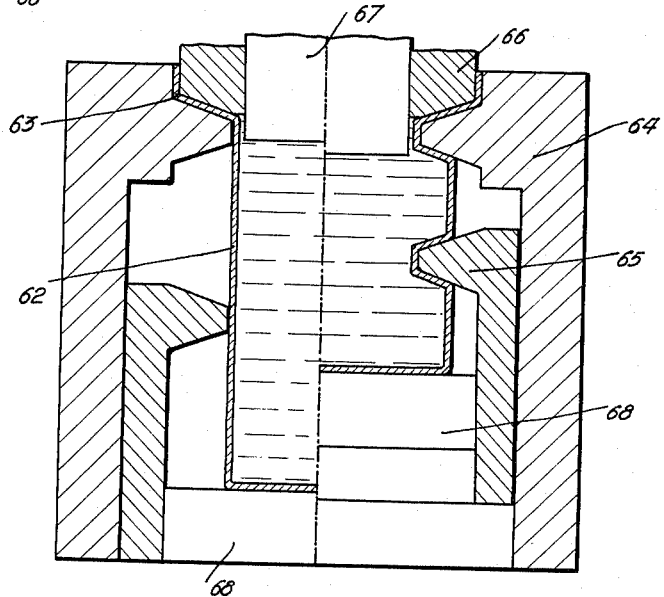
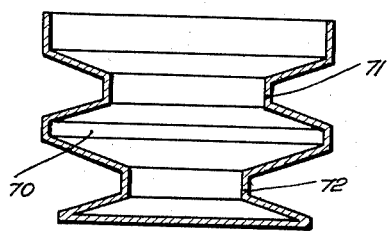

May 1, 1956  P. CUQ  2,743,691
APPARATUS FOR FORMING ARTICLES FROM HOLLOW BLANKS
Filed June 14, 1950  9 Sheets-Sheet 8

Inventor: Pierre Cuq,
By his attorneys,
Baldwin, Wight, & Brevost

United States Patent Office 2,743,691
Patented May 1, 1956

2,743,691

APPARATUS FOR FORMING ARTICLES FROM HOLLOW BLANKS

Pierre Cuq, Issy-les-Moulineaux, France, assignor to L'Emboutissage Hydraulique Moderne, Paris, France, a corporation of France Application June 14, 1950, Serial No. 167,949

Claims priority, application France June 18, 1949

7 Claims. (Cl. 113—44)

This invention relates to a method and apparatus for punching or pressing various articles of metal and other materials.

Numerous methods have been proposed and employed for forming sheet metal and similar articles by the application of pressure. Usually such methods employ dies which require provision for the removal of the dies after the forming, or initial forming, operation. In some cases, complete die formation of articles is practicable. In other cases, articles are roughed-in by dies but cannot be completed since the die cannot be withdrawn from the finished article. The roughed-in article is then placed in a form and subjected to internal fluid pressure, but such methods result in drawing the metal and thinning it in some areas. Other disadvantages frequently result, as is well known. Unsuccessful efforts have been made to overcome the various disadvantages involved in such methods.

An important object of the present invention is to provide a method and apparatus for pressing blanks into finished form while maintaining uniformly the initial thickness of the metal.

A further object is to provide a method and apparatus for accomplishing the desired results quickly and economically in a single easy operation.

Various examples of the method, in accordance with the invention, and of apparatus for carrying out the same are described more particularly hereinafter with reference to the accompanying drawings, in which:

Figure 1 is a diagram showing the successive free deformations of a cylindrical blank according to the invention, under the action of a device schematically represented in conformity with the invention.

Figure 2 is a diagram showing the continuous variations of the diameters of the blank shown in Figure 1 during deformation process.

Figure 3 is a diagram showing the variation of the volumes of the same blank and the corresponding displacements of the compensating plunger or piston during the deformation process.

Figure 4 is a diagram showing the corresponding variations of pressures;

Figure 5 is a section through spool formed by the method in accordance with the invention;

Figure 6 is a diametral section through a diagrammatically illustrated device 5 for forming the spool of Figure 5;

Figure 7 is a vertical section through a hydraulic press suited for carrying out the method with some parts shown in elevation, the parts being shown in the relative positions they occupy at the beginning of an operation;

Figure 7b is also a view similar to Figure 7 but showing the parts in the relative positions they occupy after an early part of the shaping operation has been performed, accompanied by an increase in the volume or internal capacity of the blank;

Figure 7c is also a view similar to Figure 7 but showing the parts in the relative positions they occupy after a further part of the shaping operation has been performed during which there has been a decrease in the volume or internal capacity of the blank;

Figure 8 is a diametral section through a grooved pulley made by the method in accordance with the invention;

Figure 9 is a diagrammatical sectional view of a device for making the pulley of Figure 8, the left hand part of this view showing the positions of the members at the beginning of the shaping operation, and the right hand part showing the positions of the members at the middle of the shaping operation;

Figure 10 is a diametral section through a pulley comprising two grooves made by the method in accordance with the invention;

Figure 11 is a diagrammatical section through a device for making the pulley of Figure 10, the left hand part showing the positions of the members at the beginning of the shaping operation, and the right hand part showing the positions of said members at the middle of the shaping operation;

Figure 12 is a diametral section showing a pulley having two grooves of different diameters made by the method in accordance with the invention;

Figure 14:
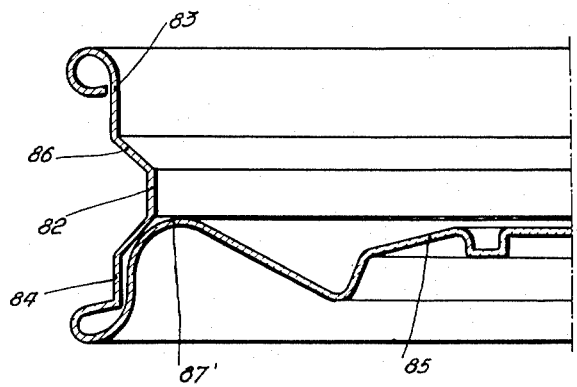
Figure 14 is a half-diametral section through a motor car wheel made by the method in accordance with the invention.
Figure 15:
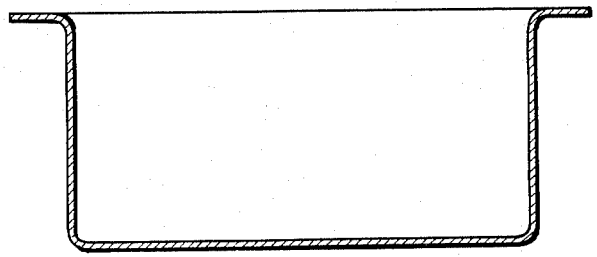
Figure 16:
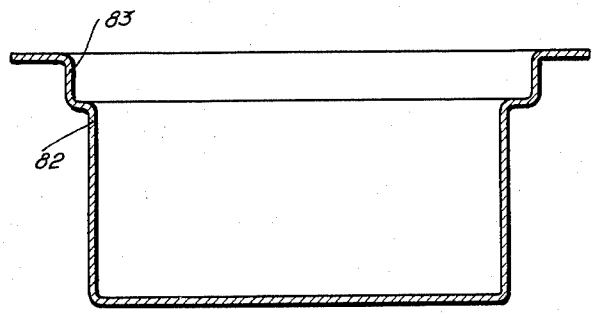
Figure 17:
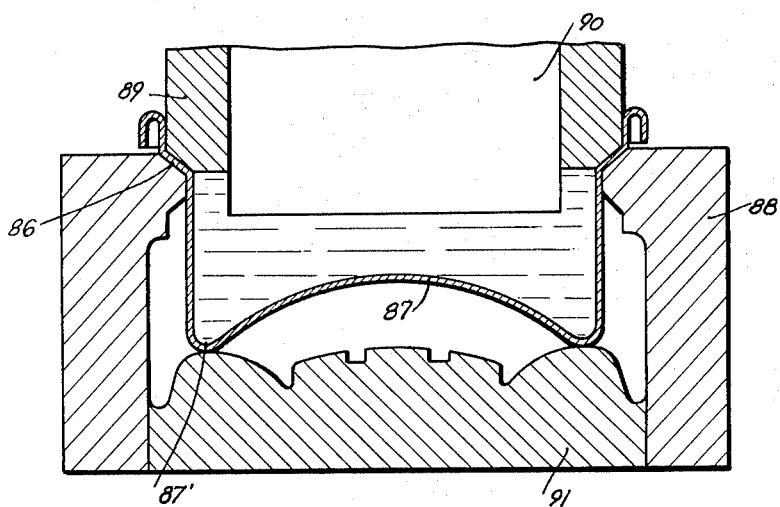

Figures 15 and 16 are respectively diametral sections through a blank used for forming the wheel shown in Figure 14, Figures 15 and 16 showing the blank respectively in its starting form and in an intermediate form; and Figure 17 is a diametral section through a device for performing the blank deformation step, corresponding to the method in accordance with the invention, to produce the wheel shown in Figure 14, the blank being shown in place in the device.

In the shaping operation shown in Figure 1, a cylindrical blank 1 is first obtained through a conventional shaping method. Said blank 1 is placed between plates 2 and 3 so that its bottom rests upon plate 2. It passes through an opening in plate 3, which opening is of the same diameter as the outside of the blank 1. The blank is formed with a flange or collar which rests on the plate 3. An annular plate 4, surrounding a reciprocable piston 5, is firmly pressed against the blank collar so as to close the interior of the blank. The piston 5 has a sliding, sealing fit in the plate 4. The blank is filled with water.

The blank, at the start, having for example a diameter of about seven centimeters and a free height between the plates 2 and 3 of twelve centimeters, the curve (Figure 2) illustrating the variations of the diameters of the blank at different stages of the shaping operation when the plates 2 and 3 are forced towards each other is drawn from these data assuming that the blank is deformed while keeping a surface equal to that of the starting blank and a free cylindrical outer wall. Said deformations are shown in dotted lines or in chain dotted lines in Figures 1 at 1a, 1b, 1c respectively corresponding to movements of plates 2 and 3 when bringing them together according to three steps respectively equal to $h_1=4$ centimeters; $h_2=8$ centimeters; $h_3=12$ cm. Experience has shown that if, at any moment, the pressure inside the blank is kept lower than a pressure.

$$\frac{2Ke}{\phi}$$

equal to which a stretching of the material would occur (K being the coefficient of elastic limit of elongation of the metal, $e$ the thickness of the blank metal wall and $\phi$ the diameter of the blank), and if said pressure is enough to avoid the formation of pleats, the deformation is performed in accordance with above-mentioned assumption. The diameter of the blank may easily be calculated at any moment of the deformation of the blank. One finds, for example, for $h_1=4$ centimeters, $\phi=8.7$ centimeters; for $h_2=8$ centimeters, $\phi=11.2$ centimeters and for $h_3=12$ centimeters, $\phi=14.7$ centimeters. It is thus easy to deduce therefrom the curve of the inner volume V of the blank at any moment (Figure 3). This curve may also represent, by a change of the origin and of the coordinates scale, the displacement L which is to be imparted to piston 5 proportionally to the displacement of plate 2, in order that the volume occupied in the blank by the incompressible liquid and that part of the plunger piston which projects into the blank, may be equal at any moment to the inner volume of said blank.

In order that deformation should be completed without stretching and without any formation of pleats, the pressure P of the liquid inside the blank is limited by a maximum pressure $P_M$ equal to $$\frac{2Ke}{\phi}$$

$\phi$ varying during the deformation, and a minimum pressure $P_m$ below which the wall would yield inwardly, and which decreases together with the free height of the blank. Both curves (Figure 4) determine the range of pressures which may be applied inside the blank during the deformation.

It is to be noted that in the case of a liquid, it is sufficient for carrying out the method of the invention to control the volume of the liquid to correspond to the variations in the inner volume of the blank, the pressure stabilizing itself between the above mentioned limits. With a compressible fluid, on the contrary, it is sufficient to control its pressure in order to maintain it in the range of the admissible pressures.

The spool shown in Figure 5 is formed of a cylindrical body 6 terminated by two end flanges 7 and 8. Body 6 and flange 7 are obtained through a conventional shaping operation, while flange 8 is formed through a shaping operation according to the present invention and similar to that which is described above with reference to Figure 1. One starts from a cylindrical blank 1', as shown in Figure 6, having the same diameter and the same thickness as the body of the spool to be obtained and a length equal to that of the body of said spool increased by a certain length, the cylindrical surface corresponding to said additional length being e. g. equal to twice the surface of the external collar of flange 8. Said blank 1' is placed in an opening die 3', said die clamping a blank length equal to the length of the body 6 of the spool. This die extends downwardly through a cylindrical recess 9 having the same diameter as the flange 8 to be obtained. Punch 2' of a hydraulic press slides in said recess 9. An annular member 4', firmly pressed downwardly, holds the blank in the die and insures the fluid tightness of the volume or chamber inside the blank. A compensating piston 5' slides in member 4'.

The blank 1' contains a volume of water sufficiently small that, at the completion of the deformation of the blank, the water may be contained in the volume of the interior of the blank and in the opening in the member 4' which the piston 5' can, upon rising, leave as water-receiving space without permitting escaping of water. The punch 2' is then forced upwardly, whilst the piston 5' is caused to move in accordance with the ordinates of a previously calculated curve which is similar to the curve shown in Figure 3. The material, for instance metal, of which the blank is made develops itself on the surface of punch 2' and on the upperwall of the recess 9, and the free side wall of the blank progressively increases in diameter while becoming shorter. The volume available for accommodating the liquid inside the blank increases commensurately, and this increase of volume is compensated for by causing piston 5' to move down in order to maintain the liquid in pressure contact with the wall of the blank. The deformation continuing, the volume decreases and the piston 5 is then raised again. By using such a method, the deformation of the blank takes place, and until a flange such as is shown at 8 in Figure 5 is formed, and as experience has shown, without any modification of the thickness of the blank which remains constant during the entire process.

Consequently, it is possible to determine the precise profile of a cam or equivalent member operated by the punch 2' and controlling the displacement of the compensating piston 5'. Experience has shown that it is more advantageous, in any case, to use the pressure range determined in Figure 4 in order to enable the piston to follow rather than to control the variations of volume of the blank. Under such conditions, it is mostly preferable only to exert on piston 5' a pressure between the maximum and the minimum pressures as determined in Figure 4.

In order to make the spool of Figure 5 or even other and more complicated parts which will be described hereinafter, the press shown in Figure 7 may be used. This press, which may be a horizontal one, comprises a movable plate 10 sliding on horizontal columns 11 which carry a stationary table 12 and a stationary yoke 13. Located between the movable plate 10 and the table 12, is a die-block sliding on horizontal guides, not shown, and comprising a plate 14 and a plate 15 connected through two toggle joints 17, 18, each being formed of a drawing-rod 17 and a connecting rod 18, on the pivot of which a roller 19 is rotatably mounted. Plates 14 and 15 carry on their opposite faces hoops 20 and 21 respectively having frusto-conical annular apertures which can co-operate with two frusto-conical end parts of the half-shells of a die 22 the composite inner surface of which corresponds to a part of the body to be produced. Another part of the die 22 is provided by the end surface of a piston 24 having a diameter such that it can slide in the two die half-shells when they are together. The die opening is further defined by a block 25 which serves to seal the interior of the blank against the escape of water, and by a compensating piston 26 slidable in the block 25 and corresponding to the piston 5' shown in Figure 6. The die, as thus constituted, has an inner surface corresponding in shape to the outer surface of the body to be produced. The body shown in Figure 7d corresponds to the spool shown in Figure 5.

The rollers 19 engage uprights 27 which act as cams for closing the toggles 17, 18 and which are fast with the movable plate 10 of the press. Compensating piston 26 also passes through the stationary table 12 of the press and carries a piston 28 at its other end. Its movement with respect to table 12 is limited, on the one hand, through piston 28 and, on the other hand, through an adjustable screw stop 29. Piston 28 moves in and forms one head of a cylinder 30, the other head of which is formed by a second piston 31 carried by an externally threaded shaft 32 provided with a handwheel 33. Threaded shaft 32 is screwed into a nut 34 sliding in the stationary yoke or plate 13. The position of the nut 34 is determined by levers 35 actuated by cams 36 themselves rotated by means of links 37 connecting the cams to the uprights 27 and by these to the movable plate 10 of the press. The piston 31 is formed with an opening closed through a ball check valve 38 connected to a compressed air tank (not shown) and another opening closed by a check valve comprising a ball 39 which, when seated, projects beyond the face of the piston 31 so as to be opened to permit the exhausting of the air remaining enclosed in cylinder 30 when pistons 28 and 31 come into contact with each other.

Around the cylinder 30 is an annular cylinder 40 in which an annular piston 41 can move. The piston carried rods 42 pass through the stationary table 12 and engage the plate 14 of the die-block. Annular cylinder 40 is connected through a pipe 43 to a compressed air tank (not shown).

The above described press operates as follows.

The blank 1' is placed in the die 22 which has been immersed in the water filling the flexible tank 23, as shown in Figure 7.

The movable press plate 10 is first brought nearer to table 12 until the cams on the ends of the uprights 27 cause the connecting rods 18 to tilt, which brings the plate 15 nearer to the plate 14 while engaging the die 22 in the hoops 20 and 21 and clamping the part 25 against upper part of the blank. The parts will then be in the positions shown in Figure 7a in readiness for performing the shaping operation, but no deformation of the blank 1' yet having been effected.

Plate 10 moves further until the upper face of the punch 24 comes into contact with the bottom of the blank. During the further movement of the punch 24 the deformation of the blank will take place as shown in Figure 1. As stated above, this deformation of the blank is accompanied initially by an increase in the internal capacity of the blank, followed later by a progressive decrease in the volume of the blank as the deformation approaches completion. The deformation of the blank must be followed, during its first stage, by a penetration, under a predetermined pressure, of the compensating piston 26 in order to compensate for the increase of volume of the blank due to its deformation. But piston 26 is already at the end of its extension stroke, because the piston 28, which is connected to the piston 26, is held against the stationary plate 12 by the original pressure of the air cushion enclosed between the piston 28 and piston 31. Said pressure has been previously established by any known means to a value between $P_M$ and $P_m$ determined on the basis of the dimensions of the starting blank (Figure 4).

It is necessary, therefore, that the die-block (and elements 14, 15, 20, 21, etc.) may move in a direction insuring a relative downward penetration of compensating piston 26 into the blank. On the other hand, it is necessary that rods 42 oppose this movement with an effort equal to the yielding resistance of the blank. This condition determines the pressure which must exist in cylinder 40. The punch 24 can then deform the blank while pushing the die-block in order to allow penetration of the compensating piston 26 into the blank, as shown in Figure 7b.

The length of the portions of the bars 42 which project beyond the stationary table 12 is such that it corresponds to the maximum displacement of the compensating piston 26 in the direction of its penetration into the blank. When the projecting portions of the bars are completely drawn into the associated guide openings in the table 12, the die block part 14 rests against the table 12, as shown in Figure 7b.

Figure 7A:
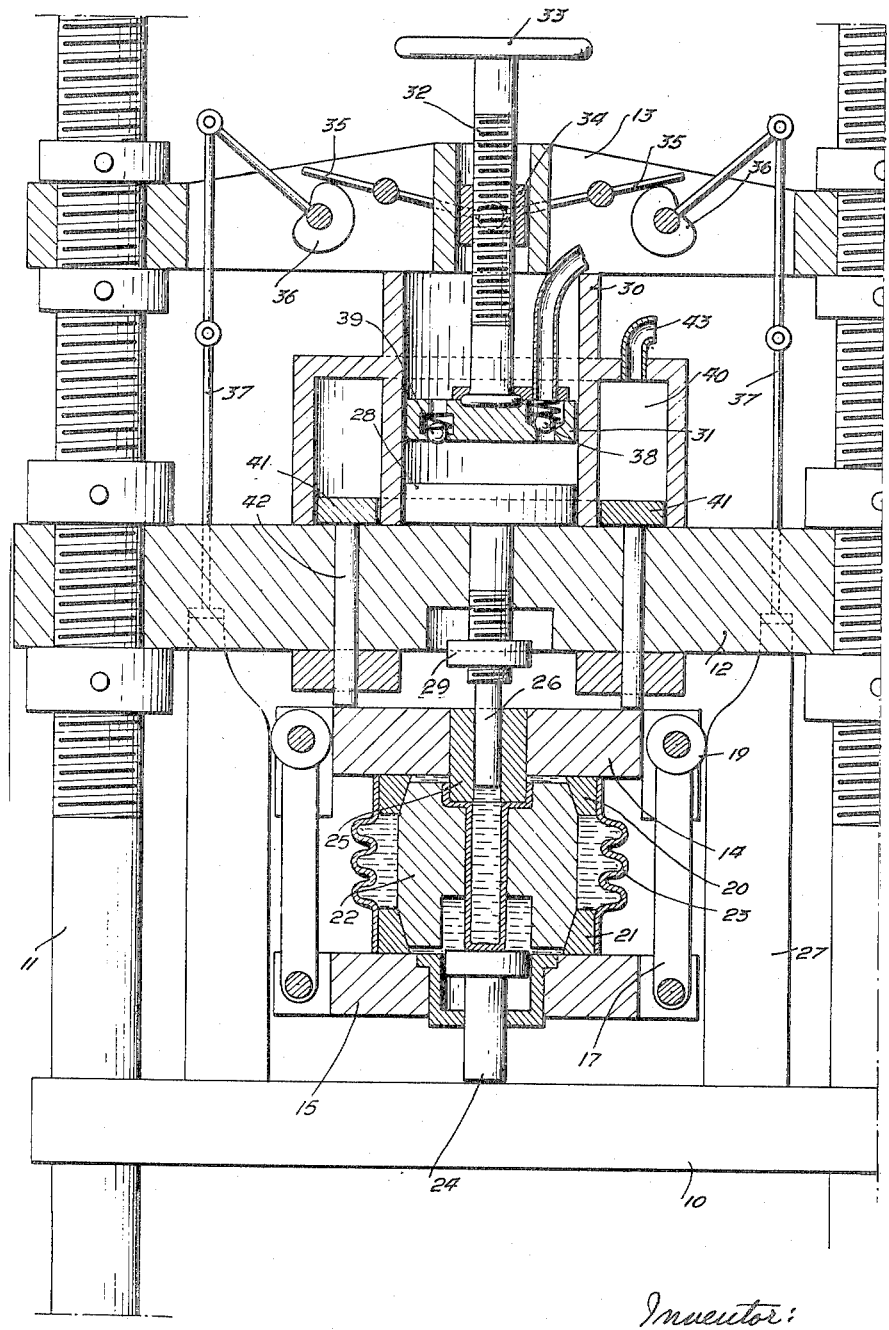
Figure 7a is a view similar to Figure 7 but showing the parts in the relative positions they occupy after the idle stroke of a movable press plate has been performed and just prior to starting a shaping operation.
Figure 7D:
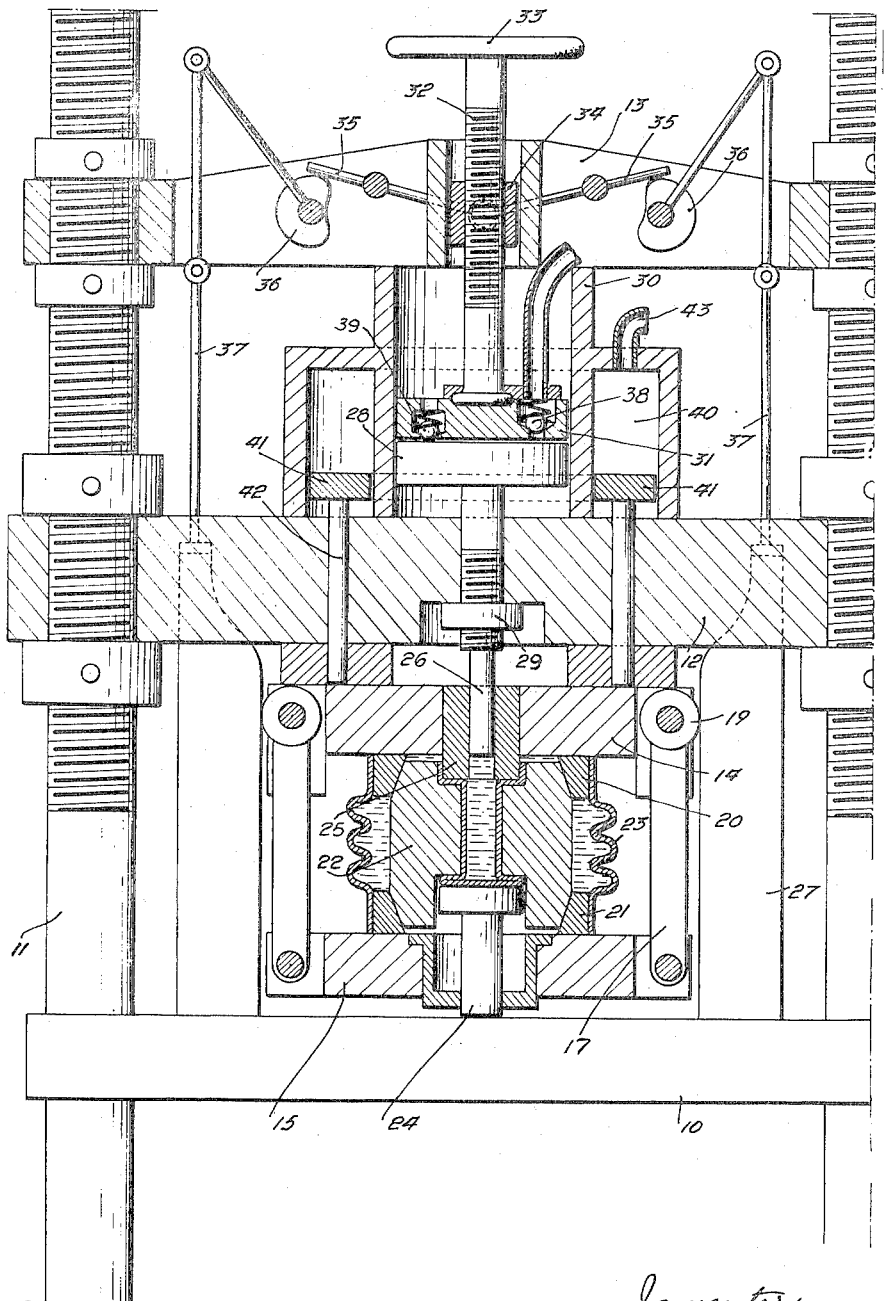
Figure 7d is a further view similar to Figure 7 but showing the parts in the relative positions they occupy after the blank has been formed to its final shape and just prior to exerting a high fluid pressure inside the blank to calibrate it.

During the movement of the parts from the positions shown in Figure 7a to the positions shown in Figure 7b the punch 24 will press against the blank 1' to cause the lower end of the blank to be deformed diametrically outwardly to start the formation of the flange 8 (Figure 5). This will be accompanied by an increase in volume of the fluid contained by the blank so that the compensating piston 26 must be advanced or moved downwardly. The advancing or upward movement of the plate 10 during this phase of the shaping operation causes cams 36 to rotate through the mediums of uprights 27 and rods 37. Those parts of the profiles of the cams which are in contact with levers 35 during this phase of the shaping operation are designed to determine such a displacement of sleeve 34 and, consequently, of piston 31 that the pressure of the air cushion acting against the piston 28 and the compensating piston 26 maintains the liquid within the blank under a pressure within the range of the admissible pressures (Figure 4).

During the succeeding displacement of yoke 10 to complete formation of the flange 8 (Figure 5) the volume or capacity of the nearly completed spool decreases. Accordingly, the compensating piston 26 must move back to the position shown in Figure 7c in accordance with the law of changing volume due to variations in the shape of the blank during shaping (Figure 3), and the pressure exerted on the liquid in the blank by the compensating piston 26 must also vary in order to be maintained within the range of admissible pressures (Figure 4).

The profiles of the parts of the cams 36 which are operative during this later phase of the operation are so designed as to effect a net displacement of the piston 31 determined on the basis of the absolute displacement of the compensating piston 26 and the relative displacement between the pistons 26 and 31 required to give the variation of thickness of the air cushion between pistons 31 and 28 corresponding to the variation of pressure which must be obtained in order to take into account the deformation of the blank.

Toward the end of the shaping operation the raising of piston 26 is limited by stop 29, while the plate 10 has not yet reached the end of its stroke; the small further displacement of the plate 10 effects a further deformation with a constant volume of liquid in the blank and the pressure within the blank rises suddenly to effect a calibration of the shaped part. Since the latter is pressed against the die the calibration is completed without any appreciable stretching.

When punch 24 moves downwardly, the bottom of the shaped part is no longer held up. In order to prevent the shaped part from being driven out through the pressure which is still exerted on piston 28, the profile of cams 36 is such, that during the calibration, said profile effects a moving down of piston 31 until the latter comes into contact with piston 28. During this movement, the valve 38 evacuates the air into the tank; when the pistons 31 and 28 come into contact with each other, the projecting ball of the second valve 39 is lifted and insures the complete exhausting of the air remaining between the two pistons. Figure 7d shows the parts in the positions they occupy just prior to opening of the valve 39.

The timing of the contact between the pistons 28 and 31 is adjusted precisely by the handwheel 33 which drives the externally threaded shaft 32 into sleeve 34.

The grooved pulley 50 which is shown in Figure 8 is made in the same way as the spool shown in Figure 5 from a cylindrical blank 51 (Figure 9) with a conical collar having the same total surface as the pulley 50 to be made and a body diameter equal to the smaller or groove diameter of the pulley to be made. Die 52 is formed of two half-shells, the upper part of which conforms to the final shape of pulley 50. An annular member 53 rests on the conical collar of the blank and forms a seal for the liquid contained in said blank. A compensating piston 54 slides through the member 53 and extends into the blank.

The displacement of the compensating piston 54 is timed by cams 36 of the above described press to the forward movement of punch 55 in such a manner that the volume of the liquid and of that part of the compensating piston which is inside the blank varies while constantly remaining equal to the different volumes which have the same surface as the initial cylindrical blank and further successive shapes such as are shown in the right hand part of Figure 9.

In order to make a pulley 60 with two grooves 61 as shown in Figure 10, both grooves 61 having the same diameter, the operation is started with a cylindrical blank 62 the inner diameter of which is equal to the diameter at the bottoms of the grooves 61, and the total surface of which is equal to the total surface of the pulley 60. The initial cylindrical blank is provided towards its opening with a conical collar 63 corresponding to part 63a of the pulley and formed in a known manner during the preliminary pressing of the blank.

The die shown in Figure 11 which is used for shaping the pulley shown in Figure 10 is formed of two stationary half-shells 64 the upper parts of which define the final shape of the first pulley groove and of both of the adjacent peripheral portions; and of two movable half-shells 65 the upper parts of which define the final shape of the second groove of the pulley. When the movable shells 65 have been moved to the upper limit of their travel in the stationary shells 64 the whole die unit forms the definitive shape of the pulley to be obtained.

The blank filled with water having been put in place in the die with a seal 66, a compensating piston 67 and a punch 68, the position of the movable shells 65 is so determined that there remains above them a blank length having a surface equal to the surface of the pulley between the second or lower pully groove and the upper pulley part 63a, and below them a blank length having a surface equal to the surface of the pulley on the other side of the second or lower groove.

When the shaping operation begins the blank 62 tends to be deformed cylindrically, but it rests against the annular movable shells 65. The deformation is initiated, therefore, simultaneously above and below the shells 65 which, owing to this fact, are carried along by the deformed metal which develops on the smaller diameter parts of the shells 64 and 65, and on the punch 68.

When the blank reaches its final deformation, shells 65 are completely driven into shells 64, and leave the final volume of the pulley 60 between them, shells 64 and punch 68. All the calculation factors which are necessary for the establishment of the diagrams of Figures 2, 3 and 4 corresponding to the manufacture of the body are determined in this way. The relations between the displacement of punch 68, the displacement of compensating piston 67 and the variations of the pressure which the latter is to exert on the liquid at any moment are thus known.

The grooved pulley 70 shown in Figure 12 is similar to the pulley 60 shown in Figure 10, but it is provided with grooves 71 and 72 of different diameters. The blank which is used for forming the pulley 70 is a cylindrical blank of diameters which decrease in steps from its top opening towards its bottom as shown in the left hand part of Figure 13. The blank comprises, from its opening to its bottom, a cylindrical collar 73 connected through a conical collar 74 to a cylindrical part 72 having the same diameter as the pulley groove 71, and a part 72a having the same diameter as the pulley groove 72, the parts 72 and 72a being connected together by a conical surface 75 having the same apex angle as the flanks of the pulley groove 72. The surface of the blank part 71a, the conical part 75 and the intervening blank part connecting the parts 71a and 75 is equal to the total surface of the bottom of the pulley groove 71 and of the step which separates it from the bottom of the pulley groove 72. The surface of the blank part 72a and of the bottom of the blank is equal to the total surface of the bottom of the pulley groove 72, of the bottom of the pulley and of the step which unites these two parts.

Figure 13:
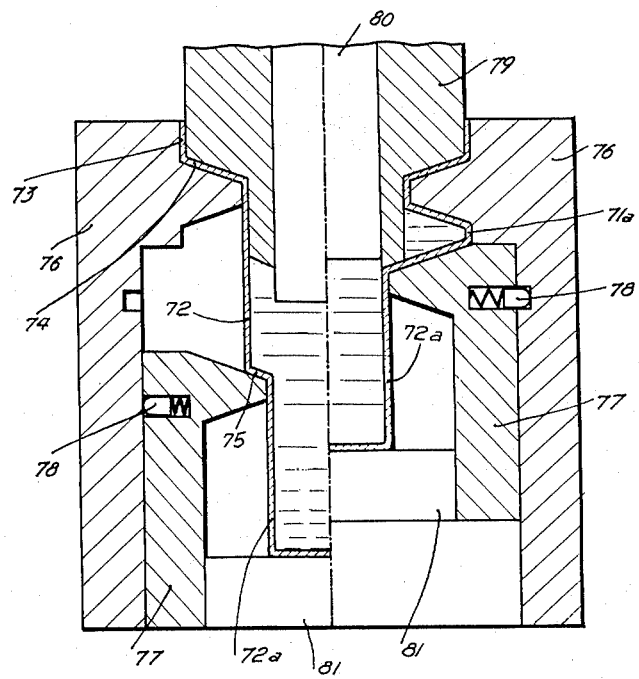
Figure 13 is a diagrammatical section through a device for making the pulley of Figure 12, the left hand part showing the positions of the members at the beginning of the shaping operation and the right hand part showing the positions of said members after the completion of the first groove.

The die for shaping the pulley shown in Figure 12 is shown in Figure 13 as comprising two stationary half-shells 76 and two movable half-shells 77 slidable longitudinally in the stationary shells 76. Spring-urged detents 78 hold the movable shells 77 fast with the stationary shells 76 when the shells 77 are completely driven into the shells 76. The blank filled with water is put in place in the die with a seal 79, a compensating piston 80 and a punch 81. The shaping operation is performed in two strokes. During the first stroke the punch 81 and half-shells 77, which rest on the conical surface 75, are raised together. This first step produces a deformation only of the part 71a which forms the pulley groove 71 and the step which separates the groove 71 from the pulley groove 72. The displacement of the compensating piston 80 and the pressure which it exerts are determined on the basis of the deformation thus effected. The lower part of the seal 79 has a shape such that at the end of this first shaping step it clamps the part 75 of the blank. The second shaping step is effected by a further movement of the punch 81 in the same manner as for the shaping of the pulley shown in Figure 8.

The shaping of more complicated pieces is effected in a similar manner, while combining the different operations of the above described method, according to circumstances, with conventional shaping steps. The method for the manufacture of the motor car wheel shown in a half-section in Figure 14 will be described by way of example. The wheel is formed of a rim which comprises a groove 82 of trapezoidal cross section with two edges 83 and 84, and a cheek or web 85 which comprises a plurality of projections for the fastening of the hub caps and of the wheel.

Firstly there is provided a cylindrical blank (Figure 15) having the same diameter as the wheel rim and a surface equal to the total surface of the finished wheel. The lower part of the blank (Figure 16) is formed to the diameter of the wheel groove 82 (Figure 14), while leaving a larger diameter part having a height equal to the width of the wheel edge 83. The upper part of the edge 83 is rolled outwardly and downwardly, the upper conical flank 86 of the groove 82 is formed, and the bottom of the blank is formed in the shape of a portion 87 of a sphere, the surface of the spherical portion inside its periphery 87' being equal to the developed surface of the wheel web inside the corresponding circle 87'. The blank is filled with water (Figure 17), and is placed in a die 88 having the external shape of the wheel rim. The blank is held in the die by the sealing member 89 resting on the blank part 86. A compensating piston 90 slides within the member 89. The shape of the punch 91 is such that it conforms to the shape of the wheel web and the lower part of the wheel edge 84.

During the shaping operation the punch 91, while rising longitudinally, presses the cylindrical wall of the blank. Since the compensating piston 90 maintains an internal fluid pressure which is such that the wall of the blank cannot yield inwardly but is insufficient for causing a stretching of the blank metal, the wall is deformed while rolling progressively on the upper part of the punch which is external with respect to circle 87' and on the walls of the die. When the punch 81 has completed its stroke the shaping of the edge 84 is achieved. During the deformation the spherical portion 87 is driven in, under the action of the pressure existing in the blank so as to engage the upper face of the punch 91. Then the calibration step is performed by increasing the pressure inside the formed wheel, the calibration pressure forcing the article being shaped to fit all the details of the die and of the end face of the punch 91.

I claim:
1. Apparatus for forming articles from a hollow sheet metal blank closed at one end and open at its other end comprising a pair of spaced parallel plates, a flexible wall of closed cross section extending between said plates, rings carried by the respective plates and having openings diverging toward each other, a die in said flexible wall adapted to received a blank filled with liquid and having a matrix shaped to conform to the exterior shape of the article to be formed, said die having tapered ends engageable in sealing relation with said rings in the respective openings thereof, a first set of cams for moving said plates toward each other to engage said tapered ends in said openings, means entering the open end of the blank when said tapered ends engage said openings to seal the interior of the blank against leakage of fluid around such means, mechanical means associated with the die and being movable for exerting a force against a portion of the blank other than said open end thereof for changing the shape of the blank into a finished article, a plunger movable through said sealing means to control the pressure of the liquid in the blank as the capacity of the blank varies incident to the changing of the shape thereof, and means for operating said plunger comprising a second set of cams acting to control at each moment of the stroke of the apparatus, the pressure and volume of the liquid in the blank, the profile of the cams of the second set being such that the pressure in the blank is sufficiently great during the stroke of the apparatus to prevent the walls of the blank from moving inwardly and is insufficient to cause a stretching of the metal of the blank, and means for exerting within the blank when the shaping is practically ended, a sufficiently high pressure to wholly apply the wall of the shaped article against the inner surface of the die and into the small recesses eventually existing in the said surface.

2. Apparatus constructed in accordance with claim 1 in which the liquid pressure controlling means comprises an air cushion interposed between the liquid in the blank and a movable member upon which act said second set of cams displaced correlatively with the movement of the closed end on the blank, the said cams being designed in relation with the article to be formed and with the dimensions of the initial blank, to increase the liquir pressure in the blank when the wall of the blank tends to unduly bend inwardly and to lessen the said liquid pressure when the metal of the meridians tends to be stretched in spite of metal being furnished to both of them by the axial action of the external force.

3. Apparatus constructed according to claim 1 in which a plunger movable through the sealing means, acts on a first piston which encloses between it and a second piston actuated by the second set of cams, an air cushion, the second piston being provided firstly with a release valve communicating with a compressed air tank which valve opens when the pressure of the air cushion supersedes the maximum pressure admissible in the blank at any moment, and secondly with a second release valve which opens when the first piston comes into contact with the second piston.

4. Apparatus constructed in accordance with claim 3 in which the piston carrying the release valves is connected with the cams of the second set of cams by means of an elongatable and retractable member to set at will the distance between the compensating piston and the piston carrying the release valves.

5. Apparatus for forming articles from hollow blanks comprising a die adapted to receive a hollow blank closed at one end and open at the other end, means for introducing liquid into the blank, means for sealing the open end of the blank, means for pressing the closed end of the blank towards the open end thereof, and control means operable conjointly with said pressing means for maintaining the pressure of the liquid within the blank sufficient to control the direction in which the blank is deformed by said pressing means but insufficient to stretch or deform the blank, said control means comprising a plunger projectable against the liquid within the blank, a cylinder, a first piston reciprocable in said cylinder and being operatively connected to said plunger, a second piston reciprocable in said cylinder, said pistons and said cylinder confining a body of elastically compressible fluid, and means operable in response to operation of said pressing means for moving said second piston relatively to said first piston for thereby determining the pressure exerted by said elastic fluid on said first piston and thus determining the force with which said plunger is projected against the liquid within the blank.

6. Apparatus as set forth in claim 5, including a valve openable in response to predetermined pressure of said compressible fluid for permitting compressible fluid to flow from said cylinder.

7. Apparatus as set forth in claim 5, including a valve carried by one of said pistons and projecting towards the other of said pistons to be contactable thereby when said pistons relatively approach each other, whereby said valve will be opened to permit said fluid to be discharged from said cylinder.

References Cited in the file of this patent

UNITED STATES PATENTS

| | | |
|---|---|---|
| 669,279 | Harrington | Mar. 5, 1901 |
| 1,461,902 | Holmes | July 17, 1923 |
| 2,111,695 | Seeber | Mar. 22, 1938 |
| 2,292,462 | Milford | Aug. 11, 1942 |
| 2,331,430 | Shoemaker | Oct. 12, 1943 |
| 2,375,599 | Walton | May 8, 1945 |
| 2,407,855 | Stephens | Sept. 17, 1946 |
| 2,493,053 | Zatyko | Jan. 3, 1950 |
| 2,522,915 | Woods | Sept. 19, 1950 |
| 2,541,869 | Grant | Feb. 13, 1951 |

FOREIGN PATENTS

| | | |
|---|---|---|
| 907,276 | France | Mar. 7, 1946 |
| 2,592,867 | Cuq | Apr. 15, 1952 |